United States Patent
Kim et al.

(10) Patent No.: US 8,204,996 B2
(45) Date of Patent: Jun. 19, 2012

(54) METHOD AND SYSTEM FOR MANAGING LOG INFORMATION OF USER USING LOCATION SERVERS BELONGING TO PLURALITY OF GROUPS

(75) Inventors: Seonghun Kim, Seoul (KR); Gyehan Song, Gyeonggi-do (KR)

(73) Assignee: NHN Corporation, Seongnam-si (KR)

( * ) Notice: Subject to any disclaimer, the term of this patent is extended or adjusted under 35 U.S.C. 154(b) by 194 days.

(21) Appl. No.: 11/959,458

(22) Filed: Dec. 18, 2007

(65) Prior Publication Data

US 2008/0126529 A1    May 29, 2008

Related U.S. Application Data

(63) Continuation of application No. PCT/KR2006/002405, filed on Jun. 22, 2006.

(30) Foreign Application Priority Data

Jun. 22, 2005    (KR) .................. 10-2005-0054078

(51) Int. Cl.
    G06F 15/16    (2006.01)
(52) U.S. Cl. .......................... 709/227; 709/224
(58) Field of Classification Search .............. 709/224, 709/204–205, 227, 229, 241, 248, 238
    See application file for complete search history.

(56) References Cited

U.S. PATENT DOCUMENTS

| | | | | |
|---|---|---|---|---|
| 4,399,531 | A * | 8/1983 | Grande et al. | 370/216 |
| 6,182,147 | B1 | 1/2001 | Farinacci | |
| 6,240,512 | B1 * | 5/2001 | Fang et al. | 713/150 |
| 6,269,080 | B1 * | 7/2001 | Kumar | 370/236 |
| 7,020,707 | B2 * | 3/2006 | Sternagle | 709/230 |
| 7,028,073 | B1 * | 4/2006 | Bui et al. | 709/203 |
| 7,437,457 | B1 * | 10/2008 | Eisendrath et al. | 709/225 |
| 2002/0026517 | A1 * | 2/2002 | Watson, Jr. | 709/228 |
| 2002/0184376 | A1 * | 12/2002 | Sternagle | 709/230 |
| 2005/0193120 | A1 * | 9/2005 | Taylor | 709/227 |
| 2006/0047822 | A1 * | 3/2006 | Willis | 709/228 |
| 2006/0130126 | A1 * | 6/2006 | Touve et al. | 726/5 |
| 2007/0115975 | A1 * | 5/2007 | Zhang | 370/390 |

FOREIGN PATENT DOCUMENTS

| | | |
|---|---|---|
| JP | 07-182297 | 7/1995 |
| JP | 2003-058717 | 2/2003 |
| JP | 2004-021572 | 1/2004 |

* cited by examiner

*Primary Examiner* — Philip Chea
*Assistant Examiner* — Eric W Shepperd
(74) *Attorney, Agent, or Firm* — H.C. Park & Associates, PLC

(57) ABSTRACT

A system and method of managing log information of a user, includes: a service server receiving a login/logout request from the user; the service server selecting a location server group to transmit a log message to, corresponding to the login/logout request, based on the user's user identifier; transmitting the log message as an anycast message from the service server to a location server of the selected location server group; the location server, which receives the log message, generating a status update message corresponding to the log message; and the location server multicasting the generated status update message to remaining location servers of the selected location server group.

12 Claims, 7 Drawing Sheets

| GROUP IDENTIFIER | USER IDENTIFIER |
|---|---|
| 1 | AAA<br>⋮<br>hzark99999 |
| 2 | i00<br>⋮<br>zzzzz000 |

701 702

METHOD AND SYSTEM FOR MANAGING LOG INFORMATION OF USER USING LOCATION SERVERS BELONGING TO PLURALITY OF GROUPS

CROSS-REFERENCE TO RELATED APPLICATION

This application is a continuation of prior International Application PCT Application No. PCT/KR2006/002405 filed on Jun. 22, 2006, which claims the benefit of priority from Korean Patent Application No. 10-2005-0054078 filed on Jun. 22, 2005. The disclosures of International Application PCT Application No. PCT/KR2006/002405 and Korean Patent Application No. 10-2005-0054078 are incorporated herein by reference.

BACKGROUND OF THE INVENTION

1. Technical Field

The present invention relates to a method and system which can manage user login/logout status information which is independently managed by a service server, via a plurality of location servers which belong to a plurality of groups.

2. Background Art

FIG. 1 is a diagram illustrating a network connection of user terminals accessing a plurality of service servers according to a conventional art.

The conventional art provides a plurality of online game services, such as a GOSTOP game, a Hula game, a poker game, a chess game, and the like, via a game site called 'hangame'. In FIG. 1, a user who uses any one of user personal computers (PC) 101 and 102 accesses to any one of game servers 104, 105, and 106 via the Internet 103. The game servers 104, 105, and 106 provide an online game that the user desires to play. As an example, the game servers 104 and 105 may provide a GOSTOP game service, and the game server 106 may provide a Hula game service. In this case, the user's login/logout was respectively performed in each of the game servers 104, 105, and 106. Also, the user's login/logout status information was respectively maintained in each of the game servers 104, 105, and 106. Accordingly, in the conventional art, a user who has logged in one game server was not able to know a current status of another user who has logged in another game server. Here, the current status may include, for example, information about whether another user has logged in or logged out from the game server, or a game that the another user is playing.

FIG. 2 is a diagram illustrating a network connection of service servers and a location server for managing users' location information according to the conventional art.

To solve the disadvantage of the configuration as shown in FIG. 1, a location server which can intensively manage users' login/logout status information in all of the game servers 204, 205, and 206 is suggested. Specifically, when users using user PCs 201 and 202 access the game servers 204, 205, 206 providing online games that the users desire to play, via the Internet 203, the game servers 204, 205, and 206 transmit the users' login/logout status information to the location server 207. In this case, since the location server 207 intensively manages the users' login/logout status information, the location server 207 may also provide another user with a current status of the users who have logged in the game servers 204, 205, and 206.

However, online games, which are provided by the conventional art, are being provided by hundreds of game servers. Accordingly, when a single location server manages login/logout status information which are managed in each of the game servers, system loads with respect to the location server are significantly increased.

When NHN Corporation launches their business in China or the like, to provide the online games, users who use the online games may geometrically increase. Even in this case, when managing all the users' login/logout status information in a single location server, the login/logout status information may be not appropriately processed due to system overloads. Also, when the users' login/logout status information is not appropriately processed, serious problems such as hacking, leaking of user information, and the like may occur.

Also, when a user's login/logout status information is managed in a single location server, and the single location server does not properly operate, the user's log information may not be updated and managed. Accordingly, the user may not utilize a service server.

Accordingly, a method and system for managing log information, which can manage a user's log information via a plurality of location servers belonging to a plurality of location server groups to solve system loads that occurs in a conventional location server, and can intensively manage the user's information by the plurality of location servers of an identical location server group maintaining identical data and status via replication, and also can normally manage the user's log information even when one of the plurality of location servers does not properly operate is required.

BRIEF SUMMARY

The present invention provides a method and system which can receive login/logout messages from a plurality of service servers, and integrally manage users' log status information, and also can manage servers for managing the log status information using a plurality of groups, and replicate servers of an identical group, and thereby reduce loads of a server managing the log status information.

The present invention also provides a method and system which can manage a user's log information by maintaining a user log status or data or status of a message buffer to be identical among location servers of an identical location server group, even when only one of the location servers of the identical location server group receives a log message.

The present invention also provides a method and system which can select a location server group to transmit a log message to, based on a user identifier, and when a user, concurrently login, the user can receive a forced logout message, process a concurrent login status, and thereby, distribute user log information, and also can prevent leakage of user information, hacking, and the like, due to the concurrent login.

The present invention also provides a log message distributor which can select a location server group to transmit a log message to, according to a user identifier, and thereby distribute the log message, and can stably manage user log information without system overloads even when a number of users geometrically increases.

The present invention also provides a service server where service servers of an identical group can maintain identical log information, and even when any one of the service servers does not receive a log message, the log message can be processed, and also, even when any one of the service servers does not properly operate, a log service can be stably provided for a user.

According to an aspect of the present invention, there is provided a method of managing log information of a user, the method including: A method of managing log information of a user, the method comprising: receiving a login/logout request for a service server from a user; selecting a location server group to transmit a log message thereto, corresponding to the received login/logout request, wherein the location server group includes a plurality of location servers; transmitting the log message from the service server to a first location server included in the selected location server group, wherein the log message includes login/logout status of the user; upon receipt of the log message, generating a status update message for the first location server to which the log message is transmitted, corresponding to the log message; and transmitting the generated status update message to other location servers of the selected location server group.

According to another aspect of the present invention, there is provided a method of managing log information of a user, the method including: a service server receiving a login/logout request from the user; selecting a location server group to transmit a log message to, corresponding to the login/logout request; the service server transmitting the log message to any one of location servers of the selected location server group; the location server, which receives the log message, generating a status update message corresponding to the log message; and the location server transmitting the generated status update message to remaining location servers of the selected location server group.

According to still another aspect of the present invention, there is provided a method of managing log information of a user, the method including: maintaining a plurality of location servers that manage users' log information, the plurality of location servers forming at least one group; wherein a user's log message corresponds to the user's log information that includes a login/logout status of a user; in response to receipt of the log message, updating a first message buffer by referring to the received log message, generating a status update message associated with the updating, and transmitting the generated status update message to a second location server of the group; and updating a second message buffer by referring to the received status update message.

According to yet another aspect of the present invention, there is provided a system for managing log information of a user, the system including: a message receiving unit configured for receiving a login/logout request from a user; a message generation unit configured for generating a log message corresponding to the login/logout request, wherein the log message includes login/logout status of the user; a message allocation unit configured for selecting a location server group to transmit the log message thereto, wherein the location server group includes a plurality of location servers; and a message transmission unit configured for transmitting the log message to a first location server of the selected location server group.

According to still another aspect of the present invention, there is provided a system for managing log information of a user, the system including: a message receiving unit for receiving a log message corresponding to the user's login/logout request from a service server, the log message comprising a user identifier; a message allocation unit for identifying the user identifier comprised in the log message, and selecting a location server group to transmit the log message to, based on the user identifier; and a message transmission unit for transmitting the log message to any one of location servers of the selected location server group.

According to still another aspect of the present invention, there is provided a location server group comprising: a plurality of location servers, each location server being communicatively coupled with the other location servers of the location server group via network, wherein each of the location servers comprises: a message receiving unit configured for receiving a log message from a service server, wherein the log message includes a user identifier, login/logout status of the user, and a location information associated with the user's login/logout location; a message generation unit configured for generating a status update message corresponding to the log message; and a message transmission unit configured for transmitting the generated status update message to the other location servers of the location server group in multicasting delivery scheme.

DETAILED DESCRIPTION OF EMBODIMENTS

Figure 1:
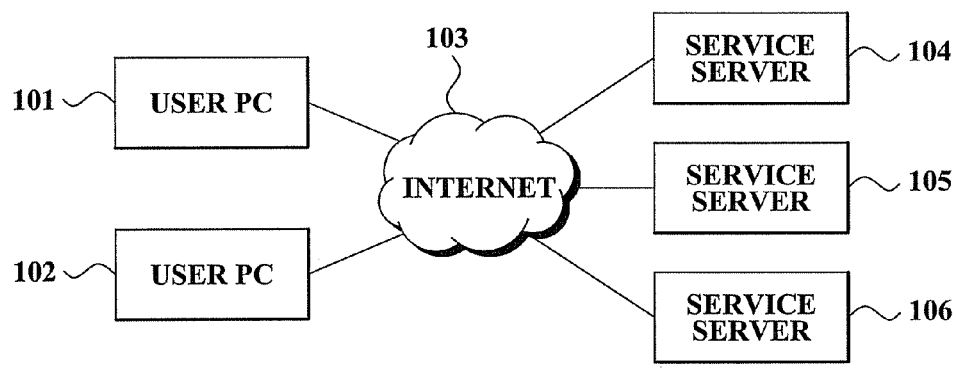
FIG. 1 is a diagram illustrating a network connection of user terminals accessing a plurality of service servers according to a conventional art.
Figure 2:
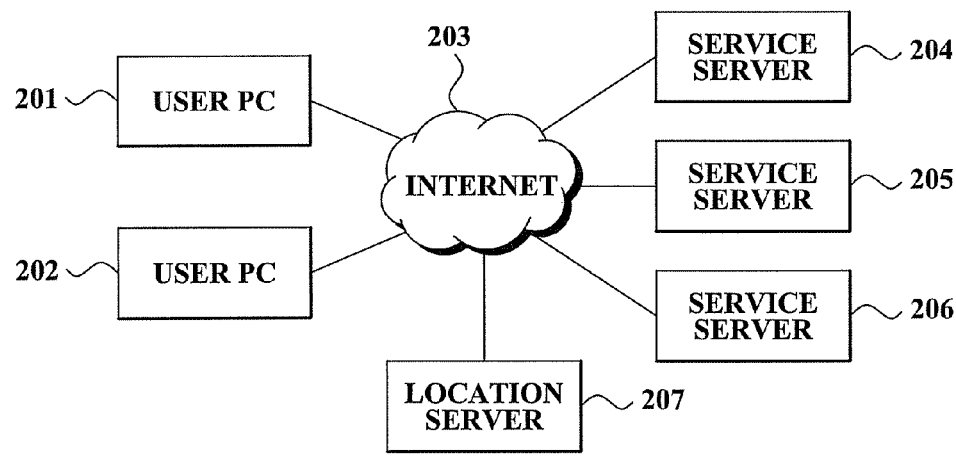
FIG. 2 is a diagram illustrating a network connection of service servers and a location server for managing users' location information according to the conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "unit" and "system" are intended to refer to a computer-related entity including hardware. For example, a unit can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more units can reside within a process and/or thread of execution, and a module or unit can be localized on one computer and/or distributed between two or more computers.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
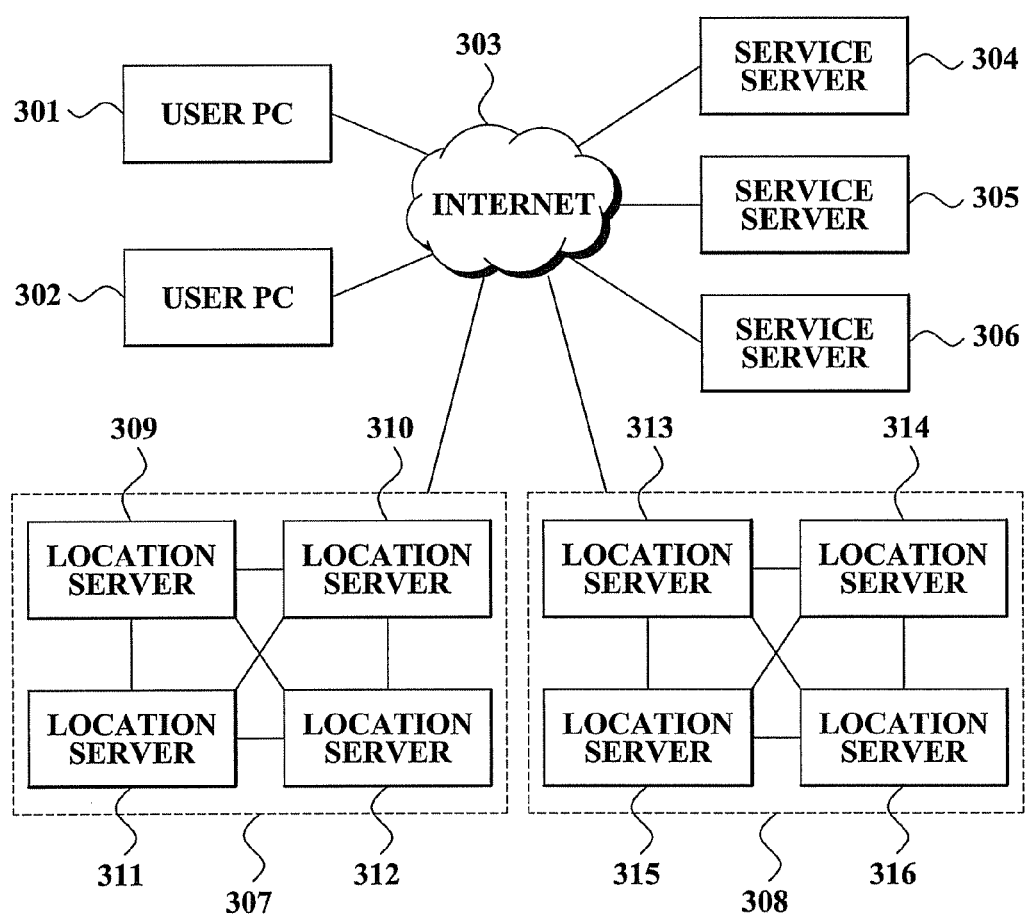
FIG. 3 is a diagram illustrating a network connection of a user terminal, a service server, and a plurality of location server groups including a plurality of location servers, according to an exemplary embodiment of the present invention.

FIG. 3 is a diagram illustrating a network connection of a user terminal, a service server, and a plurality of location server groups including a plurality of location servers, according to an exemplary embodiment of the present invention. Here, the plurality of location servers of an identical location server group of the plurality of location server group must maintain identical status information in association with a user's login/logout status.

Users access service servers 304, 305, and 306 via the users' user personal computers (PC) 301 and 302, and the Internet 303, and enter a login/logout request. In this instance, the service servers 304, 305, and 306 provide online games that the users desire to play, and receive the login/logout request from the users.

Each of the service servers 304, 305, 306 transmits a user login/logout message (external message) to any one of location servers 309, 310, 311, 312, 313, 314, 315, and 316 of location server groups 307 and 308.

In this case, when the service servers 304, 305, and 306 transmit the external message to not one of the location servers 309, 310, 311 and 312 of the location server group 307, but all the locations servers, connections among hundreds of service servers and hundreds of location servers must be managed. Consequently, status synchronization among the location servers 309, 310, 311 and 312 of the location server group 307 becomes significantly difficult. Accordingly, in the present invention, the service servers 304, 305, and 306 transmit the external message to any one of the location servers 309, 310, 311, and 312 of the location server group 307.

Also, the service servers 304, 305, and 306 may utilize anycast. A network, which enables the connections among the service servers 304, 305, and 306, and the location servers 309, 310, 311, 312, 313, 314, 315, and 316, must provide anycast capability.

The location servers 309, 310, 311, 312, 313, 314, 315, and 316 may be included in any one of the plurality of location server groups 307 and 308. As described above, according to the present invention, it is possible to distribute and process user log information by dividing a plurality of location servers and allocating the same to a location server group.

Specifically, when a number of users who utilize a service server geometrically increase, a necessity of distributing and processing log information becomes very important. According to the present invention, even when the number of users who utilize the service server increase, the users' log information may be distributed and processed. Accordingly, the users may stably utilize the service which is provided from the service server.

Also, the user log information which is processed in each location server group may be classified based on a user identifier. As an example, when the user identifier starts with any one of letters "a through h", the location server group 307 manages the user's log information. When the user identifier starts with any one of letters "i through z", the location server group 308 manages the user's log information. In the above-described example, an alphabetical character has been utilized for the user identifier, but the present invention is not limited thereto. It is also possible to classify the user identifier using another method, and process the classified user identifier in each location server group.

In the above example, the service servers 304, 305, and 306 select a location server group to transmit a log message to, corresponding to the login/logout request, based on the user identifier of the user that requested the login/logout.

As an example, when a user corresponding to a user identifier "aaa" enters a login/logout request in the service server 304, the location server group 307 corresponding to the user identifier "aaa" may be selected.

The service server 304 transmits the log message, as an anycast message, to the location server 309 of the selected location server group 307.

In this instance, the log message includes the user's user identifier, the user's login/logout status, and a location identifier associated with the user's logged in/logged out location. Also, the user identifier is utilized for identifying the user. As an example, a user identifier which a user who has logged in to/logged out from a service server may be utilized as the user's user identifier. The user's login/logout status is information about whether the user has logged in or logged out. Also, the user's location information is information about a location where the user has logged in or a location where the user has logged out. The location information may be information about the service server where the user has logged in/logged out, for example, an Internet Protocol (IP) address of the service server and a name of the service server. Also, the location information may be an identifier of the service where the user has logged in/logged out, for example, "GOSTOP", "Hula", and "poker". When a single service is provided via a plurality of channels, the location server may be a combination of the identifier of the service where the user has logged in/logged out and an identifier of the channel where the user has logged in/logged out. Accordingly, the location information provides information about the user's most recent logged in or logged out location in the entire service environment.

The location server 309, which receives the log message, processes the log message and generates a status update message. Also, the location server 309 transfers the generated status update message to remaining location servers 310, 311, and 312 of the location server group 307. In this case, the location server 309 may transfer the status update message to the remaining location servers 310, 311, and 312, using a multicast method. For this, the network enabling the connections among the location servers 309, 310, 311, and 312 must provide multicast capability.

As another embodiment, the location server 309 stores an address of each of the remaining location servers 310, 311, and 312 of the location server group 307. The location server 309, which receives the log message, transfers the status update message to each of the remaining location servers 310, 311, and 312, using an anycast method.

As described above, the location server 309 which receives the log message synchronizes data and status of the location servers 309, 310, 311, and 312 of the location server group 307, and integrally manages a user's log information by generating the status update message corresponding to the log message, and multicasting the generated update status message to remaining location servers 310, 311, and 312 of the location server group 307.

Figure 4:
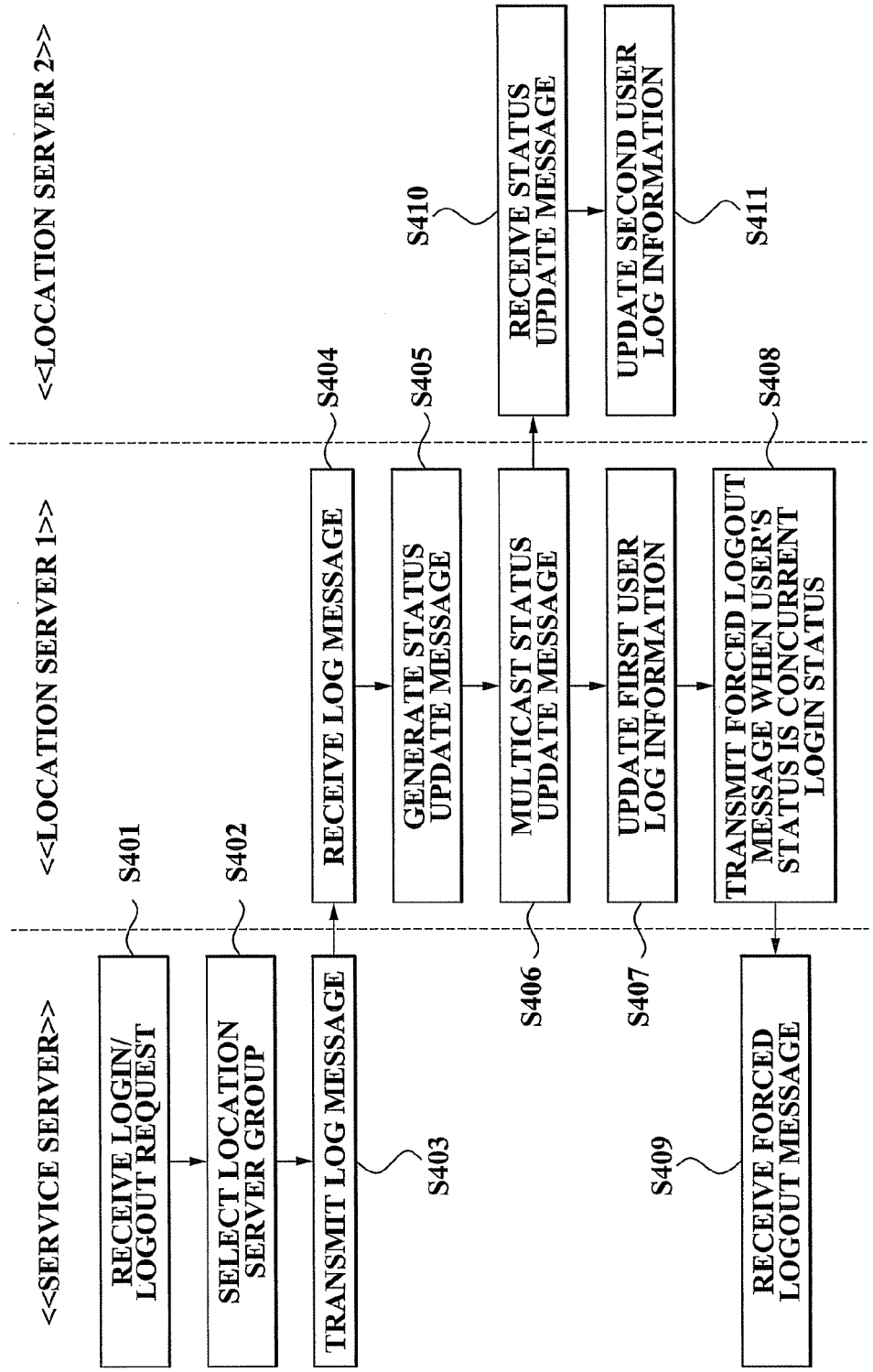
FIG. 4 is a flowchart illustrating a process of receiving and processing a log message, which is received from a service server, in a location server of a location server group according to an exemplary embodiment of the present invention.

FIG. 4 is a flowchart illustrating a process of receiving and processing a log message, which is received from a service server, in a location server of a location server group according to an exemplary embodiment of the present invention.

A process of processing a log message in a location server group will be described with reference to FIG. 4.

In operation S401, a service server receives a login/logout request from a user.

In operation S402, the service server selects a location server group to transmit a log message corresponding to the login/logout request, based on the user's identifier.

As described above, since the service server maintains a user identifier and a location server group identifier corresponding to the user identifier, the service server may select the location server group corresponding to the user identifier.

As an example, the service server may select a corresponding location server group, so that a log message of a user whose user identifier starts with any one of letters "a through h", is transmitted to a location server of a location server group 1, and the log message of the user whose user identifier starting with any one of letters "i through z", is transmitted to a location server of a location server group 2.

In this instance, the log message includes the user's user identifier, the user's login/logout status, and a location identifier associated with the user's logged in/logged out location. As an example, the log message may include "aaa" for the user identifier, "logout" for the user's login/logout status, and "GOSTOP-1" for the location identifier associated with the user's logged in/logged out location.

In operation S403, the service server transmits the log message, as an anycast message to a location server of the selected location server group. The anycast designates transmitting data to only one element of a predetermined group. Even when the service server transmits the log message to only one location server of the selected location server group, the location server, which receives the log message, transfers the received log message to remaining location servers of the location server group. Accordingly, all of the location servers of the identical location server group maintain the user's log information to be alike.

In operation S404, the location server of the location server group receives the log message. In operation S405, the location server generates a status update message corresponding to the log message. Here, the status update message includes information with which the location server announces to remaining location servers of the identical location server group that the user's status has been updated. Also, the status update message includes the user's user identifier, the user's login/logout status, and a location identifier associated with the user's logged in/logged out location. As an example, the log message may include "aaa" for the user identifier, "logout" for the user's login/logout status, and "GOSTOP-1" for the location identifier associated with the user's logged in/logged out location.

In operation S406, the location server multicasts the generated status update message to remaining location servers of the identical location server group. As an example, in FIG. 3, when the location server 309 receives the log message from the service server, the location server 309 may generate the status update message, and transmit the generated status update message to remaining location servers 310, 311, and 312 of the identical location server group 307.

Also, in FIG. 3, when the location server 313 receives the log message from the service server, the location server 313 may generate the status update message and transmit the generated status update message to remaining location servers 314, 315, and 316 of the identical location server group 308.

In operation S407, the location server updates first user log information stored in the location server according to the generated status update message. In this instance, the first user log information corresponds to user log information which the location server stores in a predetermined storage unit according to the status update message which is generated in the location server or according to the status update message which is received from remaining location servers of the identical location server group.

Figure 6A:
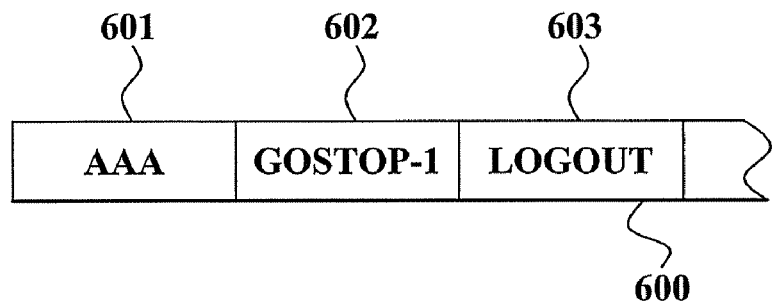
FIG. 6 is a diagram illustrating a status update message and user log information according to an exemplary embodiment of the present invention.
Figure 6B:
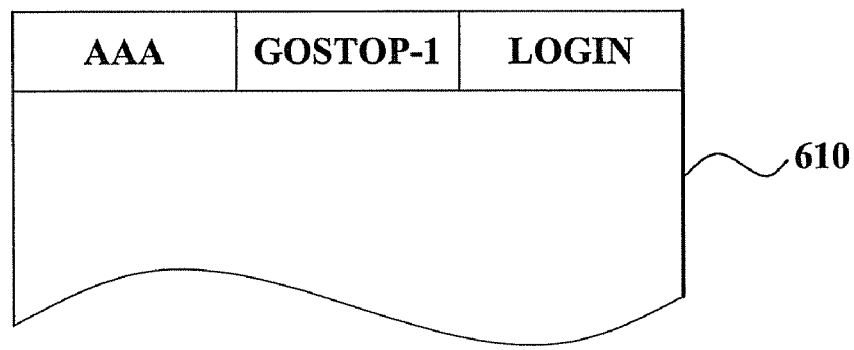
Figure 6C:
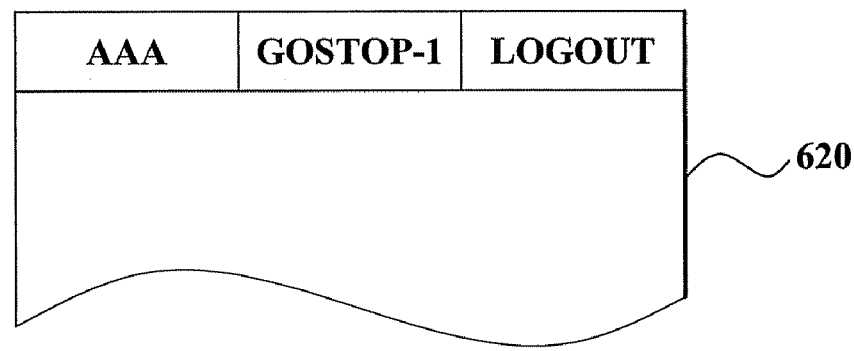

FIG. 6 is a diagram illustrating a status update message and user log information according to an exemplary embodiment of the present invention. Referring to FIG. 6, a status update message 600 includes a user identifier 601, location information 602 about the user's logged in/logged out location, and the user's login/logout status 603. When the location server receives the status update message 600 while maintaining first user log information as indicated by a reference numeral 610, the location server may update the first user log information as indicated by a reference numeral 620.

Specifically, as indicated by the reference numeral 610, the location server maintains the first user log information where a user identifier "aaa" has a "login" status in "GOSTOP-1". In this state, when generating the status update message 600 announcing that the user identifier "aaa" has a "logout" status in the "GOSTOP-1", the location server may update the first user log information to include information that the user identifier "aaa" has the "logout" status in the "GOSTOP-1", as indicated by the reference numeral 620, according to the status update message 600.

A process of updating user log information described above is identically performed as in remaining location servers of an identical location server group which receive the status update message from the location server. Accordingly, all the location servers of the identical location server group maintain identical user log information. When any location server of the identical location server group receives the log message from the user, the log message may be distributed and processed. Also, even when any one of the location servers does not properly operate, the user's log information may be normally processed.

In operation S408, the location server determines whether the user's status is a concurrent login status by referring to the updated first user log information; and transmits a forced logout message to the service server which has transmitted the log message, when the user's status is the concurrent login status. As an example, the updated status update message information includes the user identifier "aaa", the location identifier "GOSTOP-1", and the user's login/logout status "login". In this state, when the status update message where the user identifier is "aaa", the location identifier is "GOSTOP-2", and the user's login/logout status is "login" is generated and thereby, the first user log information is updated, the location server determines that the user's status is a concurrent login status, and transmits a forced logout message to the service server which has transmitted the log message, to compulsorily terminate the connection of the user who has concurrent logged in "GOSTOP-2" service server.

In operation S409, the service server receives the forced logout message and compulsorily terminates the connection of the user who has concurrent logged in.

In operation S410, remaining location servers of the identical location server group receive the status update message from the location server which received the log message. Here, the status update message may be constructed as the reference numeral 600. Also, the status update message may be in an identical format to the log message or generated by processing a portion of the format, which fall within the scope of the present invention.

In operation S411, the remaining location servers of the identical location server group update second user log information stored in the remaining location servers. Here, the status update message includes the user's user identifier, the user's login/logout status, and a location identifier about the user's logged in/logged out location. Accordingly, the remaining location servers may update the second user log information stored in the remaining location servers according to the received status update message.

Specifically, as described with FIG. 6, when the location server receives the log message which includes the user identifier "aaa", the user's login/logout status "logout", and the location identifier "GOSTOP-1" as the user log information and generates a status update message, the location server may update the first user log information of the user identifier "aaa" to include "GOSTOP-1" and "logout" according to the generated status update message.

Also, according to another embodiment of the present invention, the location server may maintain a message buffer instead of user log information, to manage user information. Specifically, the location server may update a first message buffer by referring to the received log message, generate a status update message associated with the updating, and transmit the generated status update message to other second location servers of the identical location server group. In this case, the first message buffer is included in the location server.

Also, the location server which receives the log message is referred to as a "first location server", and remaining location servers of the identical location server group are referred to as a "second location server". Each of the location servers may maintain a message buffer for receiving and storing the log message or the status update message. Namely, the message buffer stores or deletes the log message or the status update message. In this instance, the message buffer may process and store the log message or the status update message in a certain format, not storing the log message or the status update message as is, which falls within the scope of the present invention.

In FIG. 6, the first location server stores the log message where the user identifier "aaa" has the "login" status in the "GOSTOP-1", in the first message buffer, as indicated by the reference numeral 610. In this state, as indicated by the reference numeral 600, when the first location server receives the log message 600 where the user identifier "aaa" has the "logout" status in the GOSTOP-1", the first location server updates the first message buffer by referring to the received log message 600. Specifically, when the log message 610, which is stored in the first message buffer, and the received log message 600 have an opposite user status, and an identical user identifier and an identical location identifier, the first location server may update the first message buffer by deleting the stored log message 610 from the first message buffer. Also, when the received log message and the stored log message in the first message buffer are in a concurrent login status, the first location server transmits a forced logout message to the service server which has transmitted the log message, so that the service server compulsorily terminates the connection of the user who has concurrent logged in.

As described above, the status update message may be constructed as the reference numeral 600 by the first location server generating the status update message associated with the updating and transmitting the generated status update message to remaining second location servers of the identical location server group. Each of the second location servers, which received the status update message, updates a corresponding second message buffer, so that the location servers of the identical location server group may maintain identical data and status. Here, the second message buffer is included in each of the second location servers. A process of the second location servers, which received the status update message, updating the second message buffer is identical to the above-described process of updating the first message buffer.

As described above, according to the present invention, location servers of an identical location server group may maintain identical user log information by using user log information or a message buffer. Accordingly, it is possible to process a large number of user log information without system overloads. Also, even when any one of the location servers does not normally operate, the user log information may be stably managed.

According to another exemplary embodiment of the present invention, a log message distributor may be further included. The log message distributor is a network device which receives a log message from a service server, and selects a location server group to transmit the received log message. Also, the log message distributor is the network device for reducing loads to the service server by allocating the location server group to transmit the log message for each user identifier.

Figure 5:
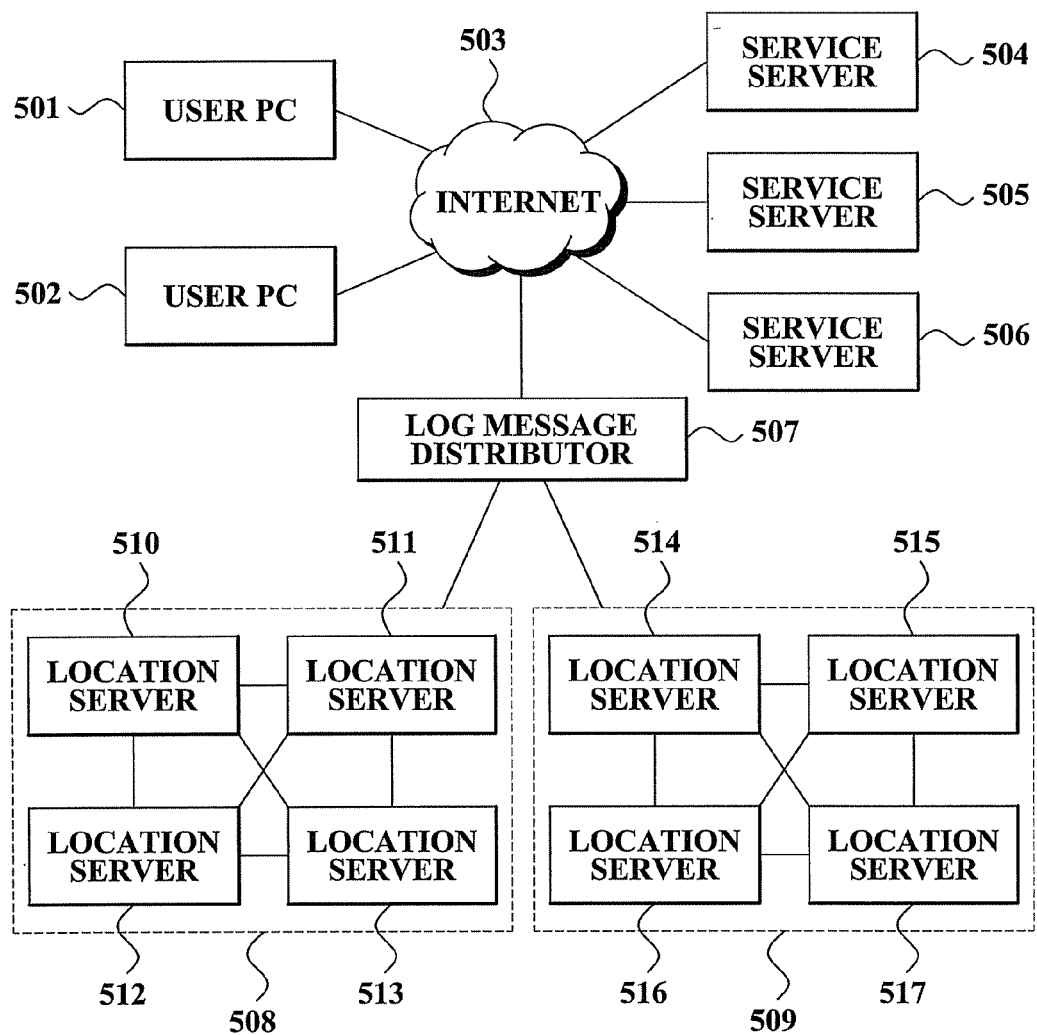
FIG. 5 is a diagram illustrating a network connection among a log message distributor, a user terminal, a service server, and a plurality of location server groups including a plurality of location servers according to another exemplary embodiment of the present invention.

FIG. 5 is a diagram illustrating a network connection of a log message distributor, a user terminal, a service server, and a plurality of location server groups including a plurality of location servers according to another exemplary embodiment of the present invention.

Users access service servers 504, 505, and 506 via the users' user personal computers (PC) 501 and 502, and the Internet 503, and enter a login/logout request. In this instance, the service servers 504, 505, and 506 provide online games that the users desire to play, and receive the login/logout request from the users.

Each of the service servers 504, 505, and 506 transmits a log message corresponding to the user login/logout request to a log message distributor 507. The log message distributor 507 selects a location server group 508 or 509 to transmit the log message corresponding to the login/logout request. Each of the location server groups 508 and 509 includes a plurality of location servers 510, 511, 512, 513, 514, 515, 516, and 517.

The log message distributor 507 maintains at least one group identifier and user identifier information which is assigned to each of the at least one group identifier, in a group information database. The user log information, which is processed in each of the location server groups 508 and 509, may be processed based on a user identifier.

Figures 7, 8:
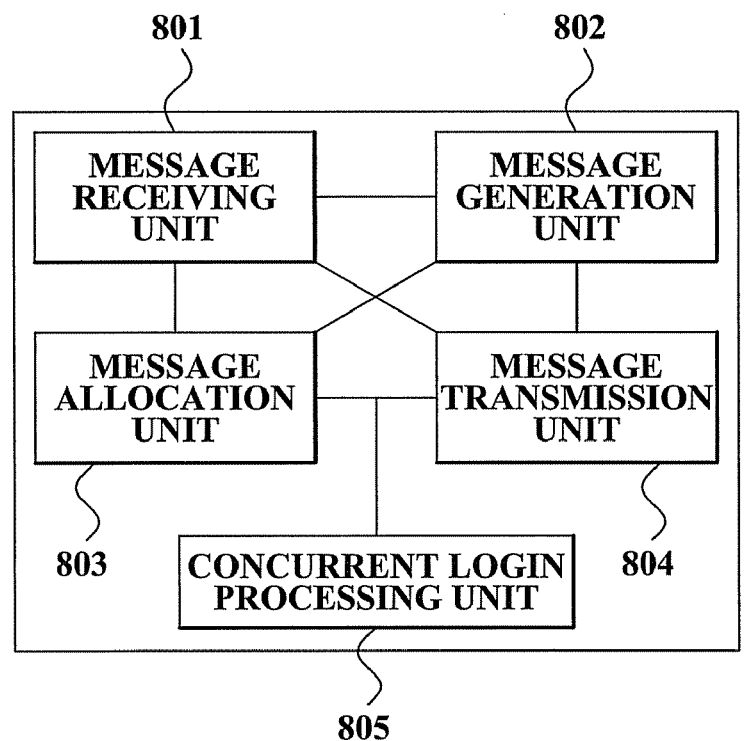
FIG. 7 is a diagram illustrating an example of a group information database according to an exemplary embodiment of the present invention.
FIG. 8 is a block diagram illustrating a configuration of a service server according to an exemplary embodiment of the present invention.

FIG. 7 is a diagram illustrating an example of a group information database according to an exemplary embodiment of the present invention. Referring to FIG. 7, the group information database includes at least one group identifier 701 and a user identifier 702 which is assigned to each of the at least one group identifier 701. As an example, a user identifier starting with any one of letters "a through h" may be allocated to a group with a group identifier 701 "1". Also, a user identifier starting with any one of letters "i through z" may be allocated to a group with a group identifier 701 "2".

Referring again to FIG. 5, when the user identifier of the received log message starts with any one of letters "a through h", the location server group 2 508 manages the user's log information. Also, when the user identifier of the received log message starts with any one of letters "i through z", the location server group 2 509 manages the user's log information.

As an example, when the user identifier "aaa" enters a login/logout request into the service server 504, the service server 504 transmits a log message corresponding to the login/logout request to the log message distributor 507.

The log message distributor 507 maintains a user identifier which is included in the log message, and a location server group identifier corresponding to the user identifier. Accordingly, the log message distributor 507 identifies the user identifier which is included in the log message, and also identifies a group identifier which is assigned with the identified user identifier, and transmits the log message to a location server corresponding to the identified group identifier. As an example, the log message distributor 507 identifies the user identifier, "aaa", and the group identifier assigned with the user identifier, "location server group 1", and transmits the log message to the location server 510 included in the location server group 1 508.

As described above, according to the present invention, since the log message distributor 507 classifies a plurality of location servers and allocates the classified location servers to a location server group, user log information may be distributed and processed.

The log message distributor 507 transmits the log message, as an anycast message, to any one of the location servers of the selected location server group 1 508. Depending upon embodiments, the log message distributor 507 may reduce loads in a location server group by transmitting the log message to any one of location servers of the location server group using a round robin method.

The location server 510, which received the log message, processes the log message and generates a status update message. As described with FIG. 6, the location server 510 transfers the status update message to the remaining location servers 511, 512 and 513 of the location server group 1 508. In this case, a process of the location server 510 transferring the status update message to the remaining location servers 511, 512 and 513 using a multicast method is identical to operations S404 through S410 of FIG. 4.

Specifically, as described above, the location server 510 which received the log message, synchronizes data and status of the location servers 510, 511, 512, and 513 of the location server group 1 508, and integrally manages a user's log information by generating the status update message corresponding to the log message, and multicasting the generated status update message to remaining location servers 511, 512, and 513 of the location server group 1 508.

Also, the location server, which received the log message, updates the first user log information stored in the location server 510 according to the generated status updated message, and determines whether the user's status is a concurrent login status by referring to the updated first user log information. When the user's status is the concurrent login status, the location server 510 transmits a forced logout message to the service server 504. The service server 504 receives the forced logout message and processes the user's concurrent login.

Also, each of the remaining location servers 511, 512 and 513 which received the generated status update message, updates second user log information which is stored in each of the location servers 511, 512 and 513, according to the received status update message. In this case, when the user's status is the concurrent login status as a result of updating the second user log information, the location server 510 transmits a forced logout message to the service server which has transmitted the log message, to compulsorily terminate the connection of the user who has concurrent logged in the service server.

Also, the location server 510 which received the log message, and the location servers 511, 512 and 513 of the identical location server group may manage a message buffer, and thereby, manage log information. Specifically, a first message buffer which is stored in the location server 510 is updated according to the received log message. Also, it is determined whether the user's status is the concurrent login status by referring to the updated first message buffer. As a result of the determination, when the user's status is the concurrent login status, the service server 504 receives the forced logout message and processes the user's concurrent login.

Also, each of the remaining location servers 511, 512 and 513 which received the status update message, updates a second message buffer which is stored in each of the remaining location servers 511, 512 and 513, according to the received status update message. As a result of updating the second message buffer, when the user's status is the concurrent login status, the connection of the user who has concurrent logged in the service server 504 is compulsorily terminated by transmitting a forced logout message to the service server 504 which has transmitted the log message.

As described above, according to the present invention, it is possible to receive login/logout messages from a plurality of service servers, and integrally manage users' log status information, and also manage servers for managing the log status information using a plurality of groups, and replicate servers of an identical location server group, and thereby reduce loads of a server managing the log status information.

Also, according to the present invention, it is possible to manage a user's log information by maintaining a user log status or data or status of a message buffer to be identical among location servers of an identical location server group, even when only one of the location servers of the identical location server group receives a log message. Accordingly, the user may stably utilize a service server.

The user log information management method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

FIG. 8 is a block diagram illustrating a configuration of a service server according to an exemplary embodiment of the present invention. Referring to FIG. 8, the service server according to the present exemplary embodiment may include a message receiving unit 801, a message generation unit 802, a message allocation unit 803, and a message transmission unit 804.

The message receiving unit 801 receives a login/logout request from a user, and receives a forced logout message from the location server. In this instance, the forced logout message includes a second user identifier. The second user identifier designates user log information which is included in the location server, or a user identifier which is determined to be a concurrent login as a result of updating a message buffer.

The message generation unit 802 generates a log message corresponding to the login/logout request.

The message allocation unit 803 selects a location server group to transmit the log message to, based on the user's user identifier. As described above, the location server group may be selected using various types of methods.

The message transmission unit 804 transmits the log message, as an anycast message, to any one of location servers of the selected location server group.

A concurrent login processing unit 805 releases the user's concurrent login status by compulsorily terminating a connection of a user corresponding to the second user identifier included in the forced logout message.

Thus, according to the present invention, it is possible to select a location server group to transmit a log message to, based on a user identifier, and when a user concurrent logged in, to receive a forced logout message, process a concurrent login status, and thereby, distribute user log information, and also prevent leaking of user information, hacking, and the like, due to the concurrent login.

Figure 9:
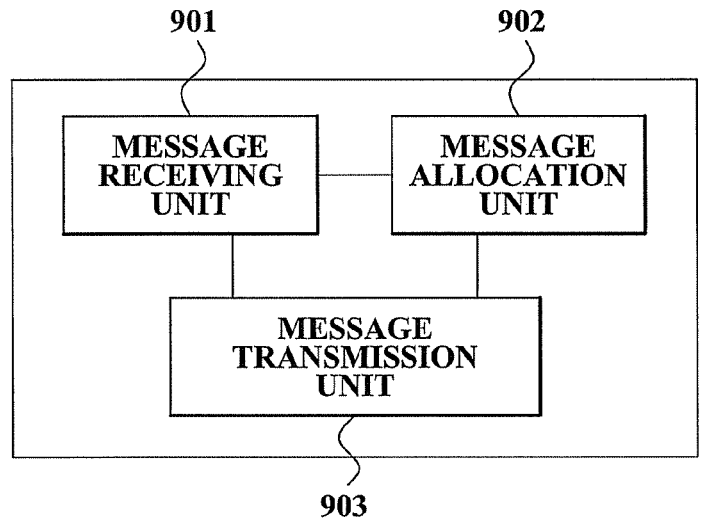
FIG. 9 is a block diagram illustrating a configuration of a log message distributor according to an exemplary embodiment of the present invention.

FIG. 9 is a block diagram illustrating a configuration of a log message distributor according to an exemplary embodiment of the present invention. Referring to FIG. 9, the log message distributor according to the present exemplary embodiment includes a message receiving unit 901, a message allocation unit 902, and a message transmission unit 903.

The message receiving unit 901 receives a log message corresponding to the user's login/logout request from a service server. The log message includes a user identifier.

The message allocation unit 902 identifies the user identifier included in the log message, and selects a location server group to transmit the log message, based on the user identifier. As described with FIG. 7, the log message distributor maintains a location server group identifier and a user identifier assigned to the location server group, and selects the location server group to transmit the log message to, based on the user identifier.

The message transmission unit 903 transmits the log message to any one of location servers of the selected location server group. In this case, the message transmission unit 903 may transmit the log message, as an anycast message, to any one of location servers of the location server group.

Thus, according to the present invention, it is possible to select a location server group to transmit a log message to, according to a user identifier, and thereby distribute the log message. Also, even when a number of users significantly increase, it is possible to stably manage user log information without system overloads.

Figure 10:
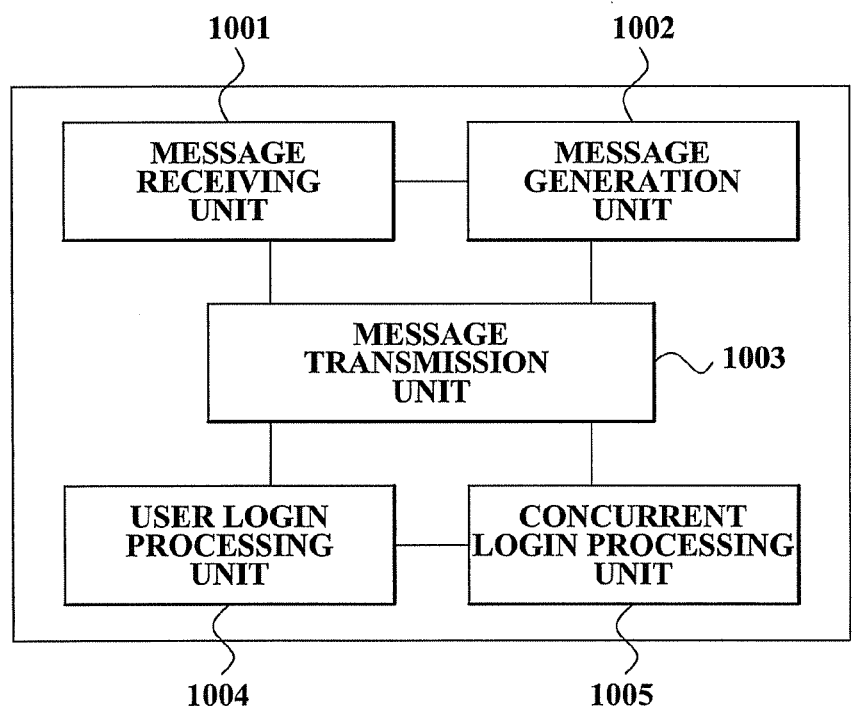
FIG. 10 is a block diagram illustrating a configuration of a location server according to an exemplary embodiment of the present invention.

FIG. 10 is a block diagram illustrating a configuration of a location server according to an exemplary embodiment of the present invention. The location server according to the present exemplary embodiment includes a message receiving unit 1001, a message generation unit 1002, a message transmission unit 1003, a user login processing unit 1004, and a concurrent login processing unit 1005.

The message receiving unit 1001 receives a log message. The log message includes the user's user identifier, the user's login/logout status, and location information associated with the user's logged in/logged out location. The message generation unit 1002 generates a status update message corresponding to the log message, and the message transmission unit 1003 multicasts the generated status update message to remaining location servers of the group.

The user login processing unit 1004 updates user log information stored in the location server according to the status update message which is generated in the location server, or according to the status update message which is received from the remaining location servers of the identical location server group.

The concurrent login processing unit 1005 determines whether the user's status is a concurrent login status by referring to the user log information, and when the user's status is the concurrent login status, transmits a forced logout message to the service server which has transmitted the log message. As described above, the service server may receive the forced logout message and process the user's concurrent login.

Thus, according to the present invention, service servers of an identical service server group can maintain identical log information. Also, even when any one of the service servers does not receive a log message, the log message can be processed. Accordingly, even when any one of the service servers does not properly operate, a log service can be stably provided for a user.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

According to the present invention, there is provided a method and system which can receive login/logout messages from a plurality of service servers, and integrally manage users' log status information, and also can manage servers for managing the log status information using a plurality of groups, and replicate servers of an identical group, and thereby reduce loads of a server managing the log status information.

Also, according to the present invention, there is provided a method and system which can manage a user's log information by maintaining a user log status or data or status of a message buffer to be identical among location servers of an identical location server group, even when only one of the location servers of the identical location server group receives a log message.

Also, according to the present invention, there is provided a method and system which can select a location server group to transmit a log message to, based on a user identifier, and when a user concurrent logs in, can receive a forced logout message, process a concurrent login status, and thereby, distribute user log information, and also can prevent leakage of user information, hacking, and the like, due to the concurrent login.

Also, according to the present invention, there is provided a log message distributor which can select a location server group to transmit a log message to, according to a user identifier, and thereby distribute the log message, and can stably manage user log information without system overloads even when a number of users geometrically increases.

Also, according to the present invention, there is provided a service server where service servers of an identical group can maintain identical log information, and even when any one of the service servers does not receive a log message, the log message can be processed, and also, even when any one of the service servers does not properly operate, a log service can be stably provided for a user.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more."

All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer implemented method comprising a plurality of servers having a plurality of program modules and one or more processors causing a program module to perform the steps for managing log information of a user, the method comprising:

receiving a login/logout request associated with a connection status of a service server from a user;

allocating a location server group comprising a plurality of location servers;

determining, by one of the processors, a location server from the location server group to transmit a log message to, the log message comprises a login/logout status of the user, the log message corresponding to a user identification and a service identification, wherein the allocation of the location server group and the determination of the location server is performed based on the user identification and the service identification of the login/logout request;

transmitting the log message from the service server to the determined location server of the allocated location server group in an anycast delivery scheme, wherein a location information, associated with a location of the service server for which the user is making the login/logout request, is transmitted to the determined location server;

generating, in response to receipt of the log message, an updated status message by the determined location server at which the log message has been received, wherein the updated status message corresponds to the login/logout status of the user associated with the user identification and the service identification; and transmitting the updated status message by replicating the updated status message to a second location server of the allocated location server group in a multicasting delivery scheme.

2. The method of claim 1, further comprising:
updating first user log information stored in the determined location server according to the updated status message; and
updating second user log information stored in the second location server of the allocated location server group according to the updated status message.

3. The method of claim 1, further comprising:
determining whether the login/logout status of the user is a concurrent login status by referring to the updated first user log information; and
transmitting a logout message to the service server which transmitted the log message, in response to the determination of the login/logout status of the user being a concurrent login status.

4. The method of claim 1, wherein the log message and the updated status message each comprise a user identifier of the user, a login/logout status of the user, and a location identifier associated with a previous login/logout location of the user.

5. A computer implemented method comprising a plurality of servers, each of the plurality of servers include one or more processors causing the plurality of servers to perform the steps for managing log information of a user, the method comprising:

allocating a plurality of location servers to receive and to manage user log information corresponding to a user identification and a service identification, the plurality of location servers allocated to at least one group, wherein the user log information is transferred from one of a plurality of service servers to a first location server of a group of location servers using an anycast scheme, and wherein the user log information comprises a login/logout status of a user associated with a connection to a service from the one of the plurality of service servers;

responsive to receipt of the user log information, updating a first message buffer of the first location server by referring to the received user log information;

generating a status update message associated with the user log information based on the updating of the first message buffer of the first location server;

transmitting, using a multicast scheme, the status update message by replicating the status update message to a second message buffer of a second location server of the group of location servers; and updating the second message buffer of the second location server by referring to the received status update message, wherein the received status update message corresponds to the login/logout status of the user associated with the user identification and the service identification.

6. The method of claim 5, further comprising:

determining, by any one of the first location server and the second location server, whether the login/logout status of the user is a concurrent login status by referring to the updated first message buffer or the second message buffer; and transmitting, when the login/logout status of the user is determined to be a concurrent login status, a forced logout message to the one of the plurality of service servers which transferred the log message.

7. The method of claim 5, further comprising:

maintaining a group identifier of each of the at least one group and user identifier information in a group information database, the user identifier information being assigned to the group identifier, wherein the response to the receipt of the user log information further comprises:

receiving a log message comprising the user log information, from the one of the plurality of service servers;

identifying a group identifier based on a user identification included in the first message buffer;

transmitting the received user log information to another location server corresponding to the identified group identifier; and receiving the user log information, by the other location server.

8. A system to manage log information of a user, the system comprising:

at least one processor;

at least one memory including computer program code;

a message receiving unit configured to receive a login/logout request from a user;

a message generation unit configured to generate a log message corresponding to the login/logout request, wherein the log message comprises a login/logout status of the user corresponding to a user identification and a service identification;

a message allocation unit configured to select a location server group to transmit the log message thereto, wherein the location server group comprises a plurality of location servers; and a message transmission unit configured to transmit the log message to one of the plurality of location servers of the selected location server group using an anycast network scheme, wherein the log message corresponds to the login/logout status of the user associated with the user identification and the service identification, and wherein the one of the plurality of location servers that received the log message processes the log message and generates a status update message which is transferred to the other location servers of plurality of location servers of the location server group by replicating the log message using a multicast network scheme.

9. The system of claim 8 wherein the message receiving unit is configured to receive a forced logout message from the one of the plurality of location servers, the forced logout message comprising a second user identifier, and the system further comprises:

a concurrent login processing unit configured to compulsorily terminate a connection of a user corresponding to the second user identifier comprised in the forced logout message.

10. A location server group, comprising:

at least one processor and at least one memory comprising computer program code;

a plurality of location servers, each location server being communicatively coupled with the other location servers of the location server group via a network, wherein each of the plurality of location servers comprises:

a message receiving unit configured to receive a log message from a service server, wherein the log message is transferred from the service server using an anycast delivery scheme, the log message comprising a user identifier of the user, login/logout status of the user, a service identifier, and a location information associated with the login/logout location of the user;

a message generation unit configured to generate a status update message corresponding to the log message; and a message transmission unit configured to transmit the generated status update message to the other location servers of the location server group in a multicasting delivery scheme by replicating the status update message, wherein the status update message corresponds to the log message associated with the user identifier of the user, login/logout status of the user, the service identifier, and the location information of the user.

11. The location server group of claim 10, further comprising:

a user log processing unit configured to update user log information stored in the location server according to the status update message generated in the location server, or according to the status update message received from the other location servers of the location server group.

12. The location server group of claim 10, further comprising:

a concurrent login processing unit configured to determine whether the status of the user is a concurrent login status by referring to the user log information, and to transmit a forced logout message to the service server which transmitted the log message, when the status of the user is a concurrent login status.

* * * * *